US012770859B2

(12) United States Patent
Chen et al.

(10) Patent No.: US 12,770,859 B2
(45) Date of Patent: Oct. 20, 2026

(54) POSITIVE ELECTRODE MATERIAL, PREPARATION METHOD THEREOF, AND SECONDARY BATTERY INCLUDING SAME

(71) Applicant: CONTEMPORARY AMPEREX TECHNOLOGY (HONG KONG) LIMITED, Hong Kong (CN)

(72) Inventors: Qiang Chen, Ningde City (CN); Qi Wu, Ningde City (CN); Jingpeng Fan, Ningde City (CN); Tao Huang, Ningde City (CN); Na Liu, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 621 days.

(21) Appl. No.: 18/326,025

(22) Filed: May 31, 2023

(65) Prior Publication Data

US 2023/0322579 A1 Oct. 12, 2023

Related U.S. Application Data

(63) Continuation of application No. PCT/CN2021/142035, filed on Dec. 28, 2021.

(51) Int. Cl.
*H01M 4/52* (2010.01)
*C01G 51/82* (2025.01)
(Continued)

(52) U.S. Cl.
CPC ............. *C01G 53/82* (2025.01); *C01G 51/82* (2025.01); *H01M 10/0525* (2013.01); (Continued)

(58) Field of Classification Search
None
See application file for complete search history.

(56) References Cited

U.S. PATENT DOCUMENTS

2015/0093580 A1* 4/2015 Kobayashi ............ H01M 4/525 428/403
2015/0194673 A1 7/2015 Takagi et al.
(Continued)

FOREIGN PATENT DOCUMENTS

CN 102354750 A 2/2012
CN 104485443 A 4/2015
(Continued)

OTHER PUBLICATIONS

English translation of CN 109390553 (Year: 2019).*
(Continued)

*Primary Examiner* — Yoshitoshi Takeuchi
(74) *Attorney, Agent, or Firm* — K&L Gates LLP

(57) ABSTRACT

A positive electrode material, including a core and a shell layer are provided. In some embodiments, a molecular formula of the core is $Li_{1+a}Ni_xCo_yMn_{1-x-y}M1_zO_2$, 0.8≤x<1.0, 0<y<0.2, 0<a<0.1, 0≤z<0.1, and M1 is selected from at least one of Al, Ta, and B; and a molecular formula of the shell layer is $Li_{1+b}Co_mAl_nNb_{1-m-n}M2_cO_2$, 0.85≤m<1.0, 0<n<0.15, 0<b<0.1, 0.001≤1-m-n≤0.02, 0≤c<0.05, and M2 is selected from at least one of W, Mo, Ti, Zr, Y, and Yb.

18 Claims, 3 Drawing Sheets

(51) Int. Cl.

| | |
|---|---|
| ***C01G 53/42*** | (2025.01) |
| ***C01G 53/82*** | (2025.01) |
| ***H01M 10/0525*** | (2010.01) |
| ***H01M 50/204*** | (2021.01) |

(52) U.S. Cl.

CPC ....... *H01M 50/204* (2021.01); *C01P 2004/61* (2013.01); *C01P 2006/11* (2013.01); *C01P 2006/12* (2013.01); *C01P 2006/40* (2013.01)

(56) References Cited

U.S. PATENT DOCUMENTS

| | | | | |
|---|---|---|---|---|
| 2016/0049645 | A1 | 2/2016 | Zheng et al. | |
| 2016/0156028 | A1* | 6/2016 | Je | H01M 10/052 429/231.95 |
| 2016/0268594 | A1* | 9/2016 | Kim | H01M 4/366 |
| 2016/0359165 | A1* | 12/2016 | Kim | C01G 53/82 |
| 2019/0027782 | A1 | 1/2019 | Tamura et al. | |
| 2019/0379038 | A1* | 12/2019 | Toma | C01G 53/04 |
| 2021/0167380 | A1* | 6/2021 | Choi | C01G 53/50 |
| 2021/0376317 | A1* | 12/2021 | Min | C01G 53/00 |
| 2022/0344656 | A1* | 10/2022 | Hayashi | H01M 4/505 |
| 2022/0359860 | A1* | 11/2022 | Nakayama | H01M 4/131 |
| 2022/0367859 | A1* | 11/2022 | Hayashi | C01G 53/50 |
| 2023/0402598 | A1* | 12/2023 | Jung | H01M 10/052 |
| 2025/0174648 | A1* | 5/2025 | Feng | C01G 53/50 |

FOREIGN PATENT DOCUMENTS

| | | | | |
|---|---|---|---|---|
| CN | 107546383 | A | 1/2018 | |
| CN | 107732193 | A | 2/2018 | |
| CN | 109390553 | * | 2/2019 | H01M 10/052 |
| CN | 110112393 | A | 8/2019 | |
| CN | 110165192 | A | 8/2019 | |
| CN | 110422889 | B | 7/2021 | |
| CN | 113437266 | * | 9/2021 | H01M 10/0525 |
| CN | 113437266 | A | 9/2021 | |
| EP | 3736889 | A1 | 11/2020 | |
| JP | WO 2020/0262264 | * | 12/2020 | H01M 4/36 |

OTHER PUBLICATIONS

English translation of CN 113437266 (Year: 2021).*

International Search Report received in the corresponding International Application PCT/CN2021/142035, mailed Sep. 28, 2022.

The extended European search report received in the corresponding European Application 21962752.8, mailed Jan. 15, 2024.

Office Action (with English Machine Translation), mailed Jun. 10, 2026, for corresponding Chinese Patent Application Serial No. 202180095471.3.

* cited by examiner

POSITIVE ELECTRODE MATERIAL, PREPARATION METHOD THEREOF, AND SECONDARY BATTERY INCLUDING SAME

CROSS REFERENCE TO RELATED APPLICATIONS

The present application is a continuation of International Application PCT/CN2021/142035, filed Dec. 28, 2021 and entitled "POSITIVE ELECTRODE MATERIAL, PREPARATION METHOD THEREOF, AND SECONDARY BATTERY INCLUDING SAME", the entire disclosure of which is incorporated herein by reference.

TECHNICAL FIELD

This application relates to the electrochemical field, and in particular, to a positive electrode material, a preparation method thereof, and a secondary battery, a battery module, a battery pack, and an electric apparatus including the same.

BACKGROUND

In recent years, with increasingly wide application of lithium-ion batteries, lithium-ion batteries are widely used in energy storage power supply systems such as hydroelectric power plants, thermal power plants, wind power plants, and solar power plants, and many other fields including electric tools, electric bicycles, electric motorcycles, electric vehicles, military equipment, and aerospace. Along with the great development of lithium-ion batteries, higher requirements are imposed on their energy density, cycling performance, safety performance, and the like. In addition, as selections of positive electrode active materials are increasingly limited, high-nickel positive electrode active materials are considered as the optimal choice to meet the requirement of high energy density.

However, with continuously increasing of nickel content, structural stability of the high-nickel positive electrode active material becomes worse. At present, effective methods for improving rate performance and cycling performance of materials are by means such as coating or doping. However, the existing methods all cause different degrees of damage to performances of lithium-ion batteries. For example, the gram capacities of the lithium-ion batteries are reduced and the cycling performance of lithium-ion batteries becomes worse. Therefore, existing coated or doped positive electrode materials still need to be improved.

SUMMARY

This application has been made in view of the foregoing issues. An objective of this application is to provide a positive electrode material, a preparation method thereof, and a secondary battery, a battery module, a battery pack, and an electric apparatus including the same. Such positive electrode material can improve cycling performance, rate performance, and safety performance of a secondary battery while maintaining a high specific capacity.

To achieve the foregoing objective, a first aspect of this application provides a positive electrode material, including a core and a shell layer, where a molecular formula of the core is $Li_{1+a}Ni_xCo_yMn_{1-x-y}M1_zO_2$, $0.8 \leq x < 1.0$, $0 < y < 0.2$, $0 < a < 0.1$, $0 \leq z < 0.1$, and M1 is selected from at least one of Al, Ta, and B; and a molecular formula of the shell layer is $Li_{1+b}Co_mAl_nNb_{1-m-n}M2_cO_2$, $0.85 \leq m < 1.0$, $0 < n < 0.15$, $0 < b < 0.1$, $0.001 \leq 1-m-n \leq 0.02$, $0 \leq c < 0.05$, and M2 is selected from at least one of W, Mo, Ti, Zr, Y, and Yb.

The positive electrode material including the foregoing core and shell layer and content of Nb of the shell layer being within the foregoing ranges can improve cycling performance, rate performance, and safety performance of the secondary battery while maintaining a high specific capacity of the positive electrode material.

In some embodiments, an average length-to-width ratio of primary particles of the positive electrode material is 2-11, and optionally 5-8. Doping element Nb in the shell layer enables the average length-to-width ratio of the primary particles to be controlled within the preceding ranges, thereby improving structural stability of the primary particles and long-term performances of the positive electrode material.

In some embodiments, an average diameter of the core is 2 μm-10 μm, and an average thickness of the shell layer is 0.5 μm-3 μm. With the average diameters of the core and shell layer of the positive electrode material being within the preceding ranges, a high-nickel ternary material with fine core-shell structure can be obtained and proportions of principal components in the core and shell can be controlled, maintaining high specific capacity while improving cycling performance, rate performance, and safety performance of the secondary battery.

In some embodiments, a median particle size by volume $D_v50$ of the positive electrode material is 3 μm-16 μm, and optionally 5 μm-11 μm. With the median particle size by volume $D_v50$ of the positive electrode material being within the preceding ranges, structurally stable primary particles can be obtained, maintaining high specific capacity while improving cycling performance, rate performance, and safety performance of the secondary battery.

In some embodiments, a particle size distribution of the positive electrode material satisfies $1.35 \leq (D_v90 - D_v10)/D_v50 \leq 1.50$. With the particle size distribution of the positive electrode material being within the preceding range, a quite wide particle size distribution is present, which is conducive to increasing compacted density of the positive electrode material sintered, thereby further increasing energy density of the secondary battery.

In some embodiments, a specific surface area of the positive electrode material is 0.2 $m^2$/g-1 $m^2$/g, and optionally 0.3 $m^2$/g-0.7 $m^2$/g. With the specific surface area of the positive electrode material being within the preceding ranges, corrosion by electrolyte can be alleviated, optimizing storage performance of the material.

In some implementations, a tap density TD of the positive electrode material is 1.8 g/$cm^3$-2.5 g/$cm^3$, and optionally 1.9 g/$cm^3$-2.3 g/$cm^3$. Setting the tap density TD of the positive electrode material within the preceding ranges can improve processability of the positive electrode material.

A second aspect of this application provides a preparation method of the positive electrode material according to the first aspect of this application, including the following steps (1) to (4):

- step (1): preparing a first mixed solution containing a soluble nickel salt, a first cobalt salt, and a manganese salt, preparing a second mixed solution containing a second cobalt salt and an aluminum salt, and preparing an alkali solution, an ammonia solution, and a niobium salt solution;
- step (2): adding pure water into a reactor as a solvent, adding the ammonia solution and the alkali solution in the reactor to adjust a pH value and an amino value of the solvent, stirring the resulting product, maintaining a stable reaction temperature, adding the first mixed solution, the alkali solution, and the ammonia solution concurrently into the reactor, maintaining the pH value and the amino value unchanged, and introducing an inert gas for protection, to synthesize a first precursor slurry;

step (3): adding the second mixed solution, the niobium salt solution, the alkali solution, and the ammonia solution concurrently into the reactor, and maintaining the pH value and the amino value unchanged, to synthesize a second precursor slurry; and step (4): mixing the second precursor slurry synthesized in step (3) and lithium salt based on a specified proportion for sintering to obtain a positive electrode material, where the positive electrode material includes a core and a shell layer, a molecular formula of the core is $Li_{1+a}Ni_xCo_yMn_{1-x-y}M1_zO_2$, 0.8≤x<1.0, 0<y<0.2, 0<a<0.1, 0≤z<0.1, and M1 is selected from at least one of Al, Ta, and B; and a molecular formula of the shell layer is $Li_{1+b}Co_mAl_nNb_{1-m-n}M2_cO_2$, 0.85≤m<1.0, 0<n<0.15, 0<b<0.1, 0.001≤1-m-n≤0.02, 0≤c<0.05, and M2 is selected from at least one of W, Mo, Ti, Zr, Y, and Yb.

Using the preceding method can obtain a high-nickel ternary material with fine core-shell structure and can control proportions of principal components in the core and shell, thereby taking both high capacity and high safety into account. In addition, in the preceding method, by the two steps, core forming (step (2)) and core growing (step (3)), a shell layer structure in radial distribution can be synthesized on the core, significantly improving long-term cycling performance of the high-nickel positive electrode material sintered.

In some embodiments, in step (1), the soluble nickel salt includes one or more of nickel sulfate, nickel nitrate, and nickel acetate; and/or the first cobalt salt and the second cobalt salt each include one or more of cobalt sulfate, cobalt oxalate, cobalt nitrate, and cobalt acetate; and/or the manganese salt includes one or more of manganese sulfate, manganese nitrate, and manganese acetate; and/or the aluminum salt includes one or more of aluminum sulfate, aluminum nitrate, aluminum chloride, aluminum acetate, and aluminum sulfite; and/or the niobium salt includes one or more of niobium oxalate, sodium niobate, niobium nitrate, and niobium chloride; and/or the alkali includes one or more of alkali hydroxide, alkaline earth hydroxide, and alkali metal carbonate. In this way, positive electrode materials with components in various proportions can easily be formed.

In some embodiments, in step (1), a concentration of metal ions in the first mixed solution is 1 mol/L-5 mol/L; and/or a concentration of metal ions in the second mixed solution is 1 mol/L-5 mol/L; and/or a concentration of alkali in the alkali solution is 1 mol/L-10 mol/L; and/or a concentration of ammonia in the ammonia solution is 5 mol/L-10 mol/L; and/or a concentration of niobium salt in the niobium salt solution is 0.5 mol/L-2 mol/L. Therefore, based on the concentrations of these materials, continuous feeding can ensure stable synthesis of high-nickel ternary precursors, which not only avoids process changes caused by system fluctuations due to excessive concentrations, but also ensures the production capacity of the precursors.

In some embodiments, in step (2) and step (3), the reaction pH value is 11.0-12.0, and preferably 11.2-11.6; and/or the reaction amino value is 0.1 mol/L-0.6 mol/L, and preferably 0.2 mol/L-0.5 mol/L; and/or the reaction temperature is 50° C.-70° C.; and/or a stirring velocity is 200 rpm-600 rpm. Therefore, the reaction pH value and the reaction amino value being within the preceding ranges can continuously and steadily be produce high-nickel ternary precursors with core-shell structures and whose median particle size by volume $D_{v50}$ is within specified ranges (for example, a range of 3 μm-16 μm). At the preceding reaction temperature, a crystal structure with well-arranged primary particles of the high-nickel ternary precursor can be formed. At the preceding stirring velocity, the high-nickel ternary precursor with dense particles and uniform porosity can be synthesized while avoiding large-particle breakage.

In some embodiments, in step (4), a molar ratio of the lithium salt to metals in the second precursor slurry, Li/Me, is 0.9-1.1, where Me is the total mole number of nickel, cobalt, and manganese; and/or a sintering temperature is 700° C.-900° C.; and/or a sintering time is 10 h-20 h; and/or a sintering atmosphere is air atmosphere or oxygen-containing atmosphere. In this way, the synthesized high-nickel ternary material has good structural stability while having smaller amount of lithium impurities, less side reactions, and better long-term cycling performance.

A third aspect of this application provides a secondary battery. The secondary battery includes the positive electrode material according to the first aspect of this application or the positive electrode material prepared by using the method according to the second aspect of this application.

A fourth aspect of this application provides a battery module. The battery module includes the secondary battery according to the third aspect of this application.

A fifth aspect of this application provides a battery pack. The battery pack includes the battery module according to the fourth aspect of this application.

A sixth aspect of this application provides an electric apparatus. The electric apparatus includes at least one of the secondary battery according to the third aspect of this application, the battery module according to the fourth aspect of this application, and the battery pack according to the fifth aspect of this application.

According to this application, cycling performance, rate performance, and safety performance of a secondary battery can all be taken into account.

Figure 1:
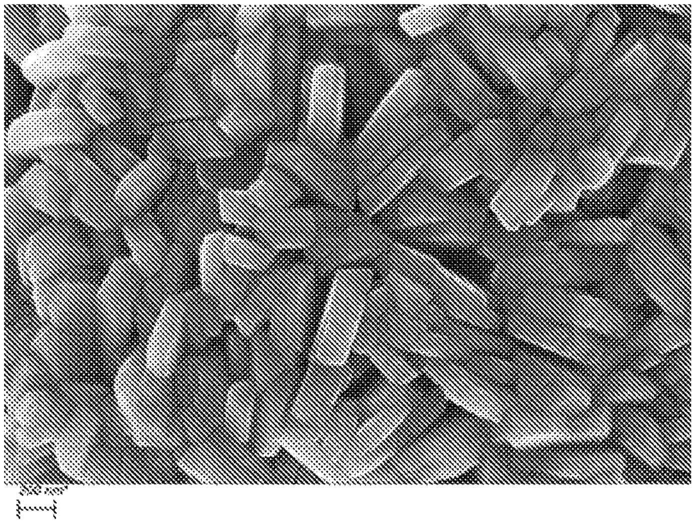
FIG. 1 is a scanning electron microscope image of a positive electrode material according to an embodiment of this application.

Reference signs are described as follows:

1. battery pack; 2. upper box body; 3. lower box body; 4. battery module; 5. secondary battery; 51. housing; 52. electrode assembly; and 53. top cover assembly.

DESCRIPTION OF EMBODIMENTS

The following specifically discloses embodiments of a positive electrode material and a manufacturing method thereof, a secondary battery, a battery module, a battery pack, and an electric apparatus in this application with appropriate reference to detailed descriptions of accompanying drawings. However, unnecessary detailed descriptions may be omitted. For example, detailed descriptions of a well-known matter or overlapping descriptions of an actual identical structure have been omitted. This is to avoid unnecessary cumbersomeness of the following descriptions, facilitating understanding by persons skilled in the art. In addition, accompanying drawings and the following descriptions are provided for persons skilled in the art to fully understand this application and are not intended to limit the subject described in the claims.

"Ranges" disclosed in this application are defined in the form of lower and upper limits, given ranges are defined by selecting lower and upper limits, and the selected lower and upper limits define boundaries of special ranges. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if lower limit values of a range are given as 1 and 2, and upper limit values of the range are given as 3, 4, and 5, the following ranges can all be envisioned: 1-3, 1-4, 1-5, 2-3, 2-4, and 2-5. In this application, unless otherwise specified, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, when a parameter is expressed as an integer greater than or equal to 2, this is equivalent to disclosure that the parameter is, for example, an integer: 2, 3, 4, 5, 6, 7, 8, 9, 10, 11, or 12.

Unless otherwise specified, all the embodiments and optional embodiments of this application can be mutually combined to form a new technical solution.

Unless otherwise specified, all the technical features and optional technical features of this application can be mutually combined to form a new technical solution.

Unless otherwise specified, "include" and "contain" mentioned in this application are inclusive or may be exclusive. For example, terms "include" and "contain" can mean that other unlisted components may also be included or contained, or only listed components may be included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

An embodiment of this application provides a positive electrode material, including a core; and a shell layer; where a molecular formula of the core is $Li_{1+a}Ni_xCo_yMn_{1-x-y}M1_zO_2$, $0.8 \leq x < 1.0$, $0 < y < 0.2$, $0 < a < 0.1$, $0 \leq z < 0.1$, and M1 is selected from at least one of Al, Ta, and B; and a molecular formula of the shell layer is $Li_{1+b}Co_mAl_nNb_{1-m-n}M2_cO_2$, $0.85 \leq m < 1.0$, $0 < n < 0.15$, $0 < b < 0.1$, $0.001 \leq 1-m-n \leq 0.02$, $0 \leq c < 0.05$, and M2 is selected from at least one of W, Mo, Ti, Zr, Y, and Yb.

Although a mechanism is not clear, the applicant has fortuitously found that a positive electrode material including a high-nickel core and a shell layer doped with Nb can improve cycling performance, rate performance, and safety performance (long-term storage performance) of the secondary battery while maintain a high specific capacity of the positive electrode material.

The inventors of this application supposed that a synthesized high-nickel ternary material with core-shell structure, with the core made of a nickel-cobalt-manganese ternary material and the shell doped with Nb, may reduce, on the premise of keeping the overall Ni content in the particles high, side reactions between a surface layer of the synthesized high-nickel positive electrode material and the electrolyte, improving long-term storage performance. Additionally, uniformly doping element Nb in the shell layer increases the average length-to-width ratio of the primary particles of the positive electrode material, which is conducive to enhancing the structural stability of the primary particles and improving the long-term performances (cycling performance and long-term storage performance) of the sintered high-nickel positive electrode material.

Figure 2:
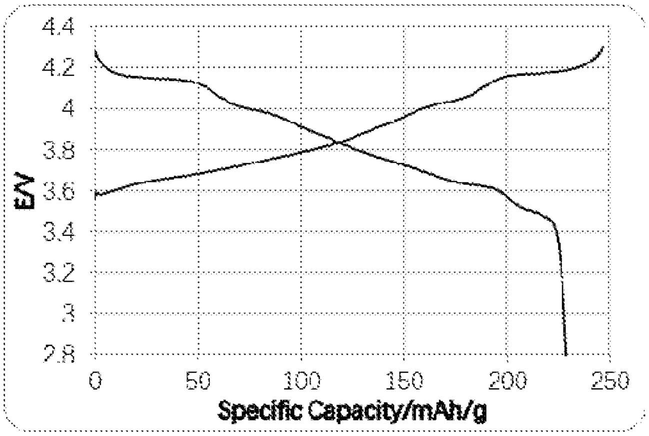
FIG. 2 shows initial charge and discharge curves of a button cell made of the positive electrode material in FIG. 1.

FIG. 1 is a scanning electron microscope image of the positive electrode material obtained in Example 1 of this application. FIG. 2 shows initial charge and discharge curves of a button cell made of the positive electrode material in FIG. 1. As shown in FIG. 1, the positive electrode material of this application has a stable structure, and the primary particles thereof have an appropriate length-to-width ratio, which can improve the long-term performance of the positive electrode material. As shown in FIG. 2, the positive electrode material of this application has good first charge-discharge efficiency.

In some embodiments, optionally, an average length-to-width ratio of the primary particles of the positive electrode material is 2-11, and optionally 5-8. Doping element Nb in the shell layer makes the average length-to-width ratio of the primary particles be controlled within the preceding ranges, thereby enhancing structural stability of the primary particles and improving long-term performance of the positive electrode material.

In some embodiments, optionally, an average diameter of the core is 2 μm-10 μm, and an average thickness of the shell layer is 0.5 μm-3 μm. With the average thicknesses of the core and the shell of the positive electrode being within the preceding ranges, a high-nickel ternary material with good core-shell structure can be obtained and proportions of the principal components in the core and shell can be controlled, high capacity can be maintained, and cycling performance, rate performance, and safety performance of the secondary battery can also be taken into account.

In some embodiments, optionally, a median particle size by volume $D_{v50}$ of the positive electrode material is 3 μm-16 μm, and optionally 5 μm-11 μm. With the median particle size by volume of the positive electrode material being within the preceding ranges, the primary particles with stable structure can be obtained, high capacity can be maintained, and cycling performance, rate performance, and safety performance of the secondary battery can also be taken into account.

In some embodiments, optionally, a particle size distribution of the positive electrode material satisfies $1.35 \leq (D_v90-D_v10)/D_v50 \leq 1.50$. With the particle size distribution of the positive electrode material being within the preceding range, a quite wide particle size distribution is present, which is conducive to increasing compacted density of the positive electrode material sintered, thereby further increasing energy density of the secondary battery.

In some embodiments, optionally, a specific surface area of the positive electrode material is 0.2 $m^2/g$-1 $m^2/g$, and optionally 0.3 $m^2/g$-0.7 $m^2/g$. With the specific surface area of the positive electrode material being within the preceding ranges, corrosion by electrolyte can be alleviated, optimizing storage performance of the material.

In some embodiments, optionally, a tap density TD of the positive electrode material is 1.8 $g/cm^3$-2.5 $g/cm^3$, and optionally 1.9 $g/cm^3$-2.3 $g/cm^3$. Setting the tap density TD of the positive electrode material within the preceding ranges can improve processability of the material.

Further, in another embodiment of this application, this application provides a preparation method of positive electrode material, including the following steps (1) to (4):

- step (1): preparing a first mixed solution containing a soluble nickel salt, a first cobalt salt, and a manganese salt, preparing a second mixed solution containing a second cobalt salt and an aluminum salt, and preparing an alkali solution, an ammonia solution, and a niobium salt solution;
- step (2): adding pure water into a reactor as a solvent, adding the ammonia solution and the alkali solution in the reactor to adjust a pH value and an amino value of the solvent, stirring the resulting product, maintaining a stable reaction temperature, adding the first mixed solution, the alkali solution, and the ammonia solution concurrently into the reactor, maintaining the pH value and the amino value unchanged, and introducing an inert gas for protection, to synthesize a first precursor slurry;
- step (3): adding the second mixed solution, the niobium salt solution, the alkali solution, and the ammonia solution concurrently into the reactor, and maintaining the pH value and the amino value unchanged, to synthesize a second precursor slurry; and
- step (4): mixing the second precursor slurry synthesized in step (3) and lithium salt based on a specified proportion for sintering to obtain a positive electrode material with core-shell structure and whose shell layer is doped with element Nb.

Using the preceding method can obtain a high-nickel ternary material with fine core-shell structure and can control proportions of principal components in the core and shell, thereby taking both high capacity and high safety into account. In addition, in the preceding method, by the two steps, core forming (step (2)) and core growing (step (3)), a shell layer structure in radial distribution can be synthesized on the core, significantly improving long-term cycling performance of the sintered high-nickel positive electrode material.

In some embodiments, in step (1), the soluble nickel salt includes one or more of nickel sulfate, nickel nitrate, and nickel acetate; and/or the first cobalt salt and the second cobalt salt each include one or more of cobalt sulfate, cobalt oxalate, cobalt nitrate, and cobalt acetate; and/or the manganese salt includes one or more of manganese sulfate, manganese nitrate, and manganese acetate; and/or the aluminum salt includes one or more of aluminum sulfate, aluminum nitrate, aluminum chloride, aluminum acetate, and aluminum sulfite; and/or the niobium salt includes one or more of niobium oxalate, sodium niobate, niobium nitrate, and niobium chloride; and/or the alkali includes one or more of alkali hydroxide, alkaline earth hydroxide, and alkali metal carbonate. In this way, positive electrode materials with components in various proportions can easily be formed.

In some embodiments, in step (1), a concentration of metal ions in the first mixed solution is 1 mol/L-5 mol/L; and/or a concentration of metal ions in the second mixed solution is 1 mol/L-5 mol/L; and/or a concentration of alkali in the alkali solution is 1 mol/L-10 mol/L; and/or a concentration of ammonia in the ammonia solution is 5 mol/L-10 mol/L; and/or a concentration of niobium salt in the niobium salt solution is 0.5 mol/L-2 mol/L. Therefore, based on the concentrations of these materials, continuous feeding can ensure stable synthesis of high-nickel ternary precursors, which not only avoids process changes caused by system fluctuations due to excessive concentrations, but also ensures the production capacity of the precursors.

In some embodiments, in step (2) and step (3), the reaction pH value is 11.0-12.0, and preferably 11.2-11.6; and/or the reaction amino value is 0.1 mol/L-0.6 mol/L, and preferably 0.2 mol/L-0.5 mol/L; and/or the reaction temperature is 50° C.-70° C.; and/or a stirring velocity is 200 rpm-600 rpm. Therefore, the reaction pH value and the reaction amino value being within the preceding ranges can continuously and stably produce high-nickel ternary precursors with core-shell structure whose median particle size by volume $D_{v50}$ is within specified ranges (for example, a range of 3 μm-16 μm). At the preceding reaction temperature, a crystal structure with well-arranged primary particles of the high-nickel ternary precursor can be formed. At the preceding stirring velocity, the high-nickel ternary precursor with dense particles and uniform porosity can be synthesized while avoiding large-particle breakage.

In some embodiments, in step (4), a molar ratio of the lithium salt to metals in the second precursor slurry, Li/Me, is 0.9-1.1, where Me is the total mole number of nickel, cobalt, and manganese; and/or a sintering temperature is 700° C.-900° C.; and/or a sintering time is 10 h-20 h; and/or a sintering atmosphere is air atmosphere or oxygen-containing atmosphere. In this way, the synthesized high-nickel ternary material has good structural stability while having smaller amount of lithium impurities, less side reactions, and better long-term cycling performance.

In addition, the following describes a secondary battery, a battery module, a battery pack, and an electric apparatus in this application with appropriate reference to the accompanying drawings.

[Secondary Battery]

In an embodiment of this application, a secondary battery is provided.

Normally, the secondary battery includes a positive electrode plate, a negative electrode plate, an electrolyte, and a separator. During charging and discharging of a battery, active ions migrate between the positive electrode plate and the negative electrode plate. The electrolyte conducts ions between the positive electrode plate and the negative electrode plate. The separator is disposed between the positive electrode plate and the negative electrode plate, mainly used for preventing short circuits of the positive and negative electrodes and allowing the ions to pass through.

[Positive Electrode Plate]

The positive electrode plate includes a positive electrode current collector and a positive electrode film layer disposed on at least one surface of the positive electrode current collector, and the positive electrode film layer includes the positive electrode active material according to the first aspect of this application.

For example, the positive electrode current collector includes two back-to-back surfaces in a thickness direction of the positive electrode current collector, and the positive electrode film layer is disposed on either or both of the two back-to-back surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the positive electrode film layer further optionally includes a binder. In an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode film layer may further optionally include a conductive agent. In an example, the conductive agent may include at least one of superconducting carbon, acetylene black, carbon black, Ketjen black, carbon dot, carbon nanotube, graphene, and carbon nanofiber.

In some embodiments, the positive electrode plate may be prepared by using the following manners: the foregoing constituents used for preparing the positive electrode plate, for example, the positive electrode active material, the conductive agent, the binder, and any other constituent, are dispersed in a solvent (for example, N-methylpyrrolidone) to form a positive electrode slurry. The positive electrode slurry is applied onto the positive electrode current collector, and processes such as drying and cold pressing are performed to obtain the positive electrode plate.

[Negative Electrode Plate]

The negative electrode plate includes a negative electrode current collector and a negative electrode film layer disposed on at least one surface of the negative electrode current collector, and the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

In some embodiments, the negative electrode current collector may be a metal foil current collector or a composite current collector. For example, for the metal foil, a copper foil may be used. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the negative electrode active material may be a well-known negative electrode active material used for a battery in the art. In an example, the negative electrode active material may include at least one of the following materials: artificial graphite, natural graphite, soft carbon, hard carbon, a silicon-based material, a tin-based material, and lithium titanate. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials, and may also use other conventional materials that can be used as the negative electrode active material of the battery. One type of these negative electrode active materials may be used alone, or two or more types may be used in combination.

In some embodiments, the negative electrode film layer further optionally includes a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the positive electrode film layer further optionally includes a conductive agent. The conductive agent may be selected from at least one of superconducting carbon, acetylene black, carbon black, Ketjen black, carbon dot, carbon nanotube, graphene, and carbon nanofiber.

In some embodiments, the negative electrode film layer further optionally includes other additives, such as a thickener (for example, sodium carboxymethyl cellulose (CMC-Na)).

In some embodiments, the negative electrode plate may be prepared by using the following manners: the constituents used for preparing the negative electrode plate, for example, the negative electrode active material, the conductive agent, the binder, and any other constituent, are dispersed in a solvent (for example, deionized water) to form a negative electrode slurry. The negative electrode slurry is applied onto the negative electrode current collector, and processes such as drying and cold pressing are performed to obtain the negative electrode plate.

[Electrolyte]

The electrolyte conducts ions between the positive electrode plate and the negative electrode plate. The electrolyte is not limited to any specific type in this application, and may be selected based on need. For example, the electrolyte may be in a liquid state, a gel state, or an all-solid state.

In some embodiments, the electrolyte is a liquid electrolyte. The liquid electrolyte includes an electrolyte salt and a solvent.

In some embodiments, the electrolyte salt may be selected from at least one of lithium hexafluorophosphate, lithium tetrafluoroborate, lithium perchlorate, lithium hexafluoroborate, lithium bisfluorosulfonyl imide, lithium bis-trifluoromethanesulfon imide, lithium trifluoromethanesulfonat, lithium difluorophosphate, lithium difluorooxalatoborate, lithium bisoxalatoborate, lithium difluorobisoxalate phosphate, and lithium tetrafluoro oxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methanesulfonate, and diethyl sulfone.

In some embodiments, the liquid electrolyte further optionally includes an additive. For example, the additive may include a negative electrode film-forming additive or a positive electrode film-forming additive, or may include an additive capable of improving some performance of the battery, for example, an additive for improving overcharge performance of the battery, or an additive for improving high-temperature or low-temperature performance of the battery.

[Separator]

In some embodiments, the secondary battery further includes a separator. The separator is not limited to any specific type in this application, and may be any commonly known porous separator with good chemical stability and mechanical stability.

In some embodiments, a material of the separator may be selected from at least one of glass fiber, non-woven fabric, polyethylene, polypropylene, and polyvinylidene fluoride. The separator may be a single-layer film or a multi-layer composite film, and is not specifically limited. When the separator is a multi-layer composite film, all layers may be made of same or different materials, which is not particularly limited.

In some embodiments, the positive electrode plate, the negative electrode plate, and the separator may be made into an electrode assembly through winding or lamination.

In some embodiments, the secondary battery may include an outer package. The outer package is used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic. Polypropylene, polybutylene terephthalate, polybutylene succinate, and the like may be listed as the plastic.

Figure 3:
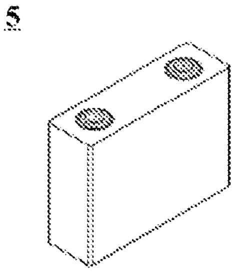
FIG. 3 is a schematic diagram of a secondary battery according to an embodiment of this application.
Figure 4:
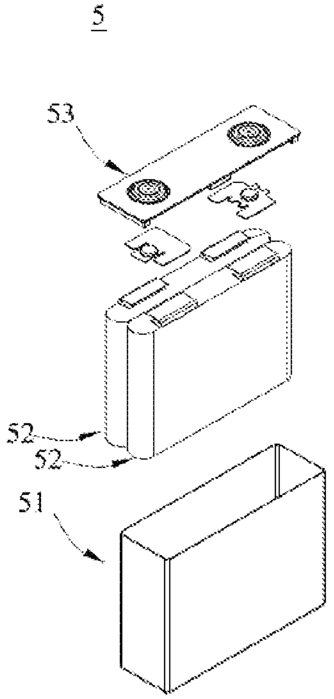
FIG. 4 is an exploded view of the secondary battery according to the embodiment of this application in FIG. 3.

The secondary battery is not limited to any specific shape in this application, and the secondary battery may be cylindrical, rectangular, or of any other shape. For example, FIG. 3 shows a secondary battery 5 of a rectangular structure as an example.

In some embodiments, referring to FIG. 2, the outer package may include a housing 51 and a cover plate 53. The housing 51 may include a base plate and a side plate connected onto the base plate, and the base plate and the side plate enclose to form an accommodating cavity. The housing 51 has an opening communicating with the accommodating cavity, and the cover plate 53 can cover the opening to close the accommodating cavity. The positive electrode plate, the negative electrode plate, and the separator may be made into an electrode assembly 52 through winding or lamination. The electrode assembly 52 is packaged in the accommodating cavity. The liquid electrolyte infiltrates the electrode assembly 52. There may be one or more electrode assemblies 52 in the secondary battery 5, and persons skilled in the art may make choices according to actual requirements.

Battery Module

In some embodiments, secondary batteries may be assembled into a battery module, and the battery module may include one or more secondary batteries. A specific quantity may be chosen by persons skilled in the art based on use and capacity of the battery module.

Figure 5:
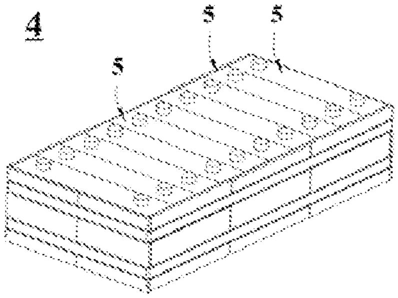
FIG. 5 is a schematic diagram of a battery module according to an embodiment of this application.

FIG. 5 shows a battery module 4 as an example. With reference to FIG. 5, in the battery module 4, a plurality of secondary batteries 5 may be sequentially arranged in a length direction of the battery module 4. Certainly, the cells may alternatively be arranged in any other manner. Further, the plurality of secondary batteries 5 may be fastened through fasteners.

Optionally, the battery module 4 may further include a housing with accommodating space, and the plurality of secondary batteries 5 are accommodated in the accommodating space.

Battery Pack

In some embodiments, the battery modules may be further assembled into a battery pack, and the battery pack may include one or more battery modules. A specific quantity may be chosen by persons skilled in the art based on use and capacity of the battery pack.

Figure 6:
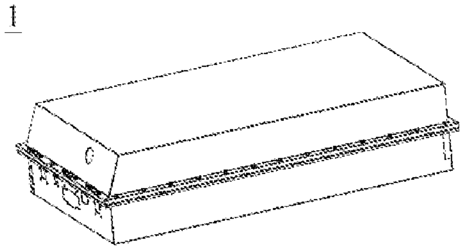
FIG. 6 is a schematic diagram of a battery pack according to an embodiment of this application.
Figure 7:
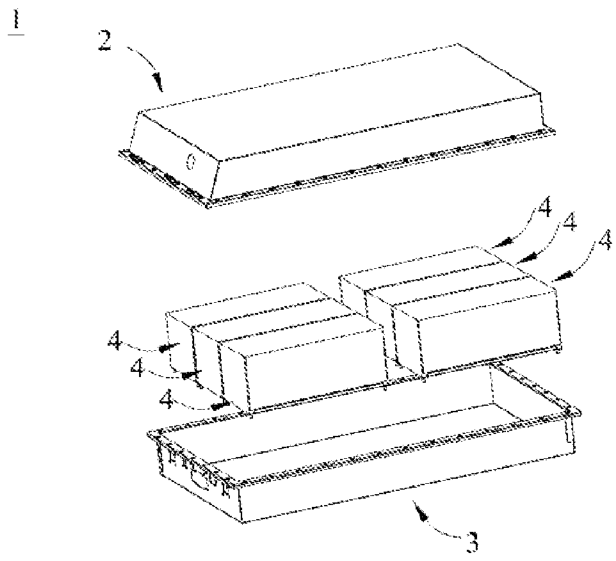
FIG. 7 is an exploded view of the battery pack according to the embodiment of this application in FIG. 6.

FIG. 6 and FIG. 7 show a battery pack 1 as an example. Referring to FIG. 6 and FIG. 7, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery module 4. The plurality of battery modules 4 may be arranged in the battery box in any manner.

Electric Apparatus

In addition, this application further provides an electric apparatus. The electric apparatus includes at least one of the secondary battery, the battery module, or the battery pack provided in this application. The secondary battery, the battery module, or the battery pack may be used as a power source for the electric apparatus, or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, and the like, but is not limited thereto.

The secondary battery, the battery module, or the battery pack may be selected for the electric apparatus based on requirements for using the electric apparatus.

Figure 8:
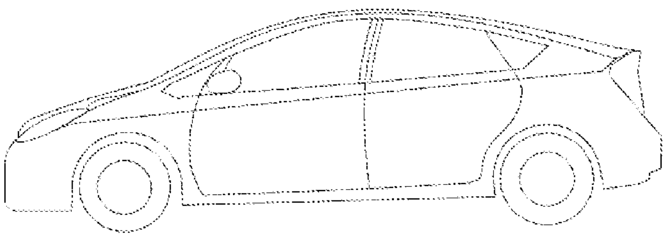
FIG. 8 is a schematic diagram of an electric apparatus using a secondary battery according to an embodiment of this application as a power source.

FIG. 8 shows an electric apparatus as an example. The electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

In another example, the apparatus may be a mobile phone, a tablet computer, a notebook computer, or the like. The apparatus usually requires to be light and thin, and a secondary battery may be used as a power source.

EXAMPLES

The following describes examples in this application. The examples described below are exemplary and only used to explain this application, but cannot be understood as construed as limitations on this application. Examples whose technical solutions or conditions are not specified are made based on technical solutions or conditions described in documents in the art, or made based on the product specification. The reagents or instruments used are all conventional products that can be purchased on the market if no manufacturer is indicated.

Example 1

(I). Preparation Method

Preparation of Positive Electrode Material

In Example 1, a preparation method of positive electrode material includes the following steps (1) to (4):

(1) Nickel sulfate, cobalt sulfate, and manganese sulfate were used in a molar ratio of Ni:Co:Mn=8:1:1 to prepare a mixed salt solution A with a concentration of 4 mol/L, cobalt sulfate, aluminum sulfate, and niobium chloride were used in a molar ratio of Co:Al:Nb=84.4:15:0.6 to prepare a mixed salt solution B with a concentration of 4 mol/L, NaOH was used to prepare a precipitant solution D with a concentration of 8 mol/L, and ammonia water with a concentration of 8 mol/L was used as a complexing agent solution E;

(2) 10 L deionized water was added into an 18 L reactor, a specified amount of ammonia water was added into the reactor to make the ammonia concentration be 0.4 mol/L, a specified amount of NaOH solution was added into the reactor to make the pH be 11.20, and the resulting product was marked as solvent F. In $N_2$ atmosphere, the solvent F was heated to 60° C. which was maintained, under a stirring velocity of 400 rpm, the mixed salt solution A, the precipitant solution D, and the complexing agent solution E were concurrently added into the solvent F for reactions for a period of time, during which the pH value and amino value were kept unchanged, and when the $D_{v50}$ of the precursor reached 8 μm, the adding the solution A was stopped;

(3) The solution B was added into the reactor to continue reacting, during the reactions, the amino value in the crystallization reactor was maintained at 0.4 mol/L and the pH was maintained at 11.20, and until a high-nickel ternary precursor with $D_v50$=10 μm was synthesized, the reaction was stopped and the precursor was left standing for 2 h. The resulting ternary precursor was cleaned, solid-liquid separated, and dried to obtain a high-nickel ternary precursor with core-shell structure and with a shell layer doped with 6000 ppm of element Nb; and (4) Lithium salt and the high-nickel ternary precursor were put into a coulter mixer in a molar ratio of, Li/Me, 1.01 for mixing, where Me was the total metal mole number of nickel, cobalt, and manganese, the mixed material was put into a kiln for sintering, where a sintering temperature was 800° C., a sintering time was 20 h, and a sintering atmosphere was 02 atmosphere, and after sintering, a core-shell high-nickel ternary material whose shell layer was uniformly doped with element Nb was obtained.

Preparation of Negative Electrode Plate

The negative electrode active material artificial graphite, conductive agent Super P, and binder SBR were mixed in a mass ratio of 96:2.5:1.5 and fully stirred in an appropriate amount of deionized water to form a uniform negative electrode slurry. The negative electrode slurry was applied onto a surface of the negative electrode current collector copper foil, followed by drying and cold pressing, to obtain a negative electrode plate.

Preparation of Positive Electrode Plate

The positive electrode material prepared by using the foregoing method, the conductive agent (Super P), and the binder PVDF were mixed in a weight ratio of 96.5:2.5:1 and fully stirred in an appropriate amount of deionized water to form a uniform positive electrode slurry. The positive electrode slurry was applied onto a surface of the positive electrode current collector aluminum foil, followed by drying and cold pressing, to obtain a positive electrode plate.

Preparation of Electrolyte

Ethylene carbonate (EC), ethyl methyl carbonate (EMC), and diethyl carbonate (DEC) were mixed at a volume ratio of 1:1:1, and then $LiPF_6$ was uniformly dissolved in the preceding solution to obtain an electrolyte, where a concentration of $LiPF_6$ was 1 mol/L.

Separator

A polyethylene (PE) film was used.

Preparation of Secondary Battery

The positive electrode plate, the separator, and the negative electrode plate were stacked in sequence and wound to obtain an electrode assembly. The electrode assembly was placed in an outer package, the foregoing electrolyte was added, and steps such as packaging, standing, chemical conversion, and aging were performed to obtain a secondary battery.

(II). Performance Test

Performance tests for the positive electrode material prepared in (I) were performed by using the following methods. Test results are shown in Table 2.

(i) Measurement of Average Length-to-Width Ratio of Primary Particles of Positive Electrode Material Static image measurement technology: the captured static SEM images of the powder were used for software intelligent identification, 20 particles were randomly selected to obtain long diameters and short diameters, and the average length-diameter ratio was calculated.

(ii) Lithium Impurity Content Measurement

Acid-base titration method: 30 g sample was added into 100 ml pure water, the resulting product was stirred for 30 min and left standing for 5 min; upon suction filtration, a 10 ml supernatant was taken, 0.05 mol/L hydrochloric acid standard solution was used to titrate the lithium carbonate and lithium hydroxide that were dissolved from the positive electrode material; by using the pH electrode as an indicator electrode, a titration end-point was determined by a sudden potential jump, and then a residual lithium amount was calculated.

(iii) Preparation Method of Button Cell

The positive electrode material prepared in (I), lithium sheet being used as the counter electrode, and a polypropylene separator were assembled to a button cell, to which 1 mol/L $LiPF_6$/(EC+DEC+DMC) (volume ratio was 1:1:1) liquid electrolyte was injected.

(iv) Tests of Initial Discharge Gram Capacity and Initial Coulombic Efficiency for Button Cell The foregoing prepared button cell was charged to 4.3 V at 0.1C under a voltage of 2.8 V-4.3 V, and then was charged a current less than or equal to 0.05 mA at a constant voltage of 4.3 V. After being left standing for 2 min, a charging capacity in this case was recorded as C0. Then, the button cell was discharged to 2.8V at 0.1C, and a discharging capacity in this case was an initial discharging capacity and was recorded as D0. An initial coulombic efficiency was D0/C0*100%.

(v) Capacity Test and Cycle Test for Full Battery

Capacity test: the battery was left standing for 5 min at a constant temperature of 25° C., discharged to 2.8V at ⅓C, left standing for 5 min, charged to 4.25 V at ⅓C, charged to a current less than or equal to 0.05 mA at a constant voltage of 4.25 V, and left standing for 5 min. A charging capacity in this case was recorded as C0. Then, the battery was discharged to 2.8 V at ⅓C, and a discharging capacity in this case was an initial gram capacity and was recorded as DO. An initial coulombic efficiency was D0/C0*100%.

Cycle test: the battery was charged to 4.25 V at 1C under a voltage of 2.8 V-4.25 V at a constant temperature of 25° C. or 45° C., and was charged to a current less than or equal to 0.05 mA at a constant voltage of 4.25 V. After being left standing for 5 min, the battery was discharged to 2.8 V at 1C, and a capacity in this case was recorded as Dn (n=0, 1, 2, . . . ). The preceding steps were repeated until the capacity reached 80%.

(vi) Gas Test for Full Battery

The battery was stored in 100% SOC at 70° C., the cell OCV, IMP, and volume (drainage method test) were measured before, after, and during the storage, after storage was ended, the residual capacity and reversible capacity of the cell were tested, the battery was taken out every 48 h, OCV and IMP were tested after the battery was left standing for 1 h, the cell volume was tested by using the drainage method after the battery was cooled to room temperature, and the battery was stored for 20 days to end the test, or the storage was stopped when the volume swelling rate exceeded 50%. The protection voltage range was 2.7 V-4.3V.

<Example 2> to <Example 20> and <Comparative Example 1> to <Comparative Example 3>

Examples 2 to 20 and Comparative Examples 1 to 3 used the same preparation method as in Example 1 to obtain a positive electrode material except that components of various solutions were changed according to Table 1.

TABLE 1

| No. | Ratio of components in core | Ratio of components in shell layer | Concentration of element Nb (ppm) | Average length-to-width ratio of primary particles | Particle size distribution $(D_v90-D_v10)/D_v50$ |
|---|---|---|---|---|---|
| Example 1 | Ni:Co:Mn = 8:1:1 | Co:Al:Nb = 84.4:15:0.6 | 6000 | 5 | 1.48 |
| Example 2 | Ni:Co:Mn = 90:5:5 | Co:Al:Nb = 84.4:15:0.6 | 6000 | 5.2 | 1.40 |
| Example 3 | Ni:Co:Mn = 95:4:1 | Co:Al:Nb = 84.4:15:0.6 | 6000 | 5.1 | 1.45 |
| Example 4 | Ni:Co:Mn = 8:1:1 | Co:Al:Nb = 89.4:10:0.6 | 6000 | 5.7 | 1.49 |
| Example 5 | Ni:Co:Mn = 90:5:5 | Co:Al:Nb = 89.4:10:0.6 | 6000 | 6.4 | 1.39 |
| Example 6 | Ni:Co:Mn = 95:4:1 | Co:Al:Nb = 89.4:10:0.6 | 6000 | 6.1 | 1.37 |
| Example 7 | Ni:Co:Mn = 8:1:1 | Co:Al:Nb = 94.4:5:0.6 | 6000 | 5.9 | 1.41 |
| Example 8 | Ni:Co:Mn = 90:5:5 | Co:Al:Nb = 94.4:5:0.6 | 6000 | 6.1 | 1.43 |
| Example 9 | Ni:Co:Mn = 95:4:1 | Co:Al:Nb = 94.4:5:0.6 | 6000 | 6.2 | 1.50 |
| Example 10 | Ni:Co:Mn = 90:5:5 | Co:Al:Nb = 84.4:15:0.3 | 3000 | 5.5 | 1.37 |
| Example 11 | Ni:Co:Mn = 90:5:5 | Co:Al:Nb = 84:15:1 | 10000 | 7.6 | 1.40 |
| Example 12 | Ni:Co:Mn = 8:1:1 | Co:Al:Nb = 84.9:15:0.1 | 1000 | 2.6 | 1.48 |
| Example 13 | Ni:Co:Mn = 90:5:5 | Co:Al:Nb = 84.9:15:0.1 | 1000 | 2.6 | 1.44 |
| Example 14 | Ni:Co:Mn = 95:4:1 | Co:Al:Nb = 84.9:15:0.1 | 1000 | 3.5 | 1.44 |
| Example 15 | Ni:Co:Mn = 90:5:5 | Co:Al:Nb = 83:15:2 | 20000 | 9.5 | 1.50 |
| Example 16 | Ni:Co:Mn = 90:5:5 | Co:Al:Nb = 88:10:2 | 20000 | 9.8 | 1.38 |
| Example 17 | Ni:Co:Mn = 90:5:5 | Co:Al:Nb = 93:5:2 | 20000 | 10.3 | 1.48 |
| Example 18 | Ni:Co:Mn:Al = 88:5:5:2 | Co:Al:Nb:W = 88.4:10:0.6:1 | 6000 | 7.3 | 1.38 |
| Example 19 | Ni:Co:Mn:Ta = 88:5:5:2 | Co:Al:Nb:Mo = 88.4:10:0.6:1 | 6000 | 6.8 | 1.36 |
| Example 20 | Ni:Co:Mn:B = 88:5:5:2 | Co:Al:Nb:Ti = 88.4:10:0.6:1 | 6000 | 6.4 | 1.40 |
| Comparative Example 1 | Ni:Co:Mn = 90:5:5 | / | / | 1.4 | 1.40 |
| Comparative Example 2 | Ni:Co:Mn = 90:5:5 | Ni:Co:Mn = 6:2:2 | / | 1.5 | 1.46 |
| Comparative Example 3 | Ni:Co:Mn = 90:5:5 | Co:Al:Nb = 82:15:3 | 30000 | 18 | 1.38 |

TABLE 2

| No | BET ($m^2/g$) | Concentration of lithium impurity (ppm) | Button cell capacity at 0.1 C. (mAh/g) | Initial coulombic efficiency (%) | Capacity at 1/3 C. (mAh/g) 100% SOC | Capacity after 300 cycles at 25° C. (%) | Capacity after 300 cycles at 45°C (%) | 70° C. 30-day gassing volume (mL/Ah) |
|---|---|---|---|---|---|---|---|---|
| Example 1 | 0.525 | 2046 | 212 | 92.45 | 205 | 95.65 | 93.05 | 4.47 |
| Example 2 | 0.479 | 2175 | 218 | 92.36 | 211 | 95.27 | 92.7 | 4.86 |
| Example 3 | 0.507 | 2131 | 229 | 92.58 | 220 | 95.06 | 92.32 | 5.44 |
| Example 4 | 0.526 | 2009 | 209 | 93.29 | 205 | 96.12 | 93.22 | 4.72 |
| Example 5 | 0.522 | 2168 | 219 | 92.86 | 213 | 95.89 | 92.79 | 4.8 |
| Example 6 | 0.515 | 2210 | 230 | 93.1 | 219 | 94.93 | 92.49 | 5.83 |
| Example 7 | 0.493 | 1980 | 210 | 92.18 | 206 | 96.01 | 92.88 | 4.69 |
| Example 8 | 0.505 | 2125 | 220 | 92.66 | 212 | 95.73 | 92.06 | 5.04 |
| Example 9 | 0.511 | 2106 | 229 | 92.75 | 220 | 95.32 | 92.31 | 5.35 |
| Example 10 | 0.482 | 2254 | 220 | 92.77 | 212 | 95.65 | 92.53 | 5.27 |
| Example 11 | 0.56 | 2077 | 222 | 92.4 | 214 | 95.73 | 92.62 | 5.81 |
| Example 12 | 0.426 | 2316 | 205 | 91.12 | 198 | 93.61 | 92.04 | 6.98 |
| Example 13 | 0.434 | 2385 | 214 | 91.82 | 207 | 93.28 | 91.3 | 7.31 |
| Example 14 | 0.438 | 2501 | 221 | 91.25 | 215 | 92.05 | 90.87 | 8.1 |
| Example 15 | 0.715 | 2277 | 215 | 91.37 | 209 | 93.44 | 91.25 | 7.64 |
| Example 16 | 0.704 | 2334 | 214 | 92.12 | 209 | 93.49 | 91.32 | 7.34 |
| Example 17 | 0.798 | 2359 | 216 | 92.06 | 211 | 93.16 | 91.26 | 7.52 |

TABLE 2-continued

| No | BET (m²/g) | Concentration of lithium impurity (ppm) | Button cell capacity at 0.1 C. (mAh/g) | Initial coulombic efficiency (%) | Capacity at 1/3 C. (mAh/g) 100% SOC | Capacity after 300 cycles at 25° C. (%) | Capacity after 300 cycles at 45°C (%) | 70° C. 30-day gassing volume (mL/Ah) |
|---|---|---|---|---|---|---|---|---|
| Example 18 | 0.637 | 1973 | 220 | 93.22 | 214 | 95.92 | 92.5 | 4.99 |
| Example 19 | 0.601 | 2084 | 218 | 92.57 | 212 | 95.47 | 92.52 | 4.76 |
| Example 20 | 0.532 | 2035 | 218 | 92.29 | 211 | 95.5 | 92.01 | 5.03 |
| Comparative Example 1 | 0.368 | 3762 | 215 | 87.4 | 206 | 84.4 | 77.6 | 21.61 |
| Comparative Example 2 | 0.349 | 3147 | 214 | 86.6 | 208 | 86.7 | 79.2 | 18.91 |
| Comparative Example 3 | 1.195 | 3066 | 219 | 88.31 | 209 | 88.91 | 82.46 | 15.8 |

It can be learned from results in Tables 1 and 2 that, based on comparison between Examples 1-20 and Comparative Examples 1-3, the shell layer containing Nb in a specified range can not only significantly reduce concentration of lithium impurities on a surface of the high-nickel ternary positive electrode material and significantly increase material capacity and raise initial coulombic efficiency, but also significantly improve cycling performance, storage performance, and gassing performance of the high-nickel ternary positive electrode material.

In addition, it can be known from comparison between Examples 1, 4, and 7 that contents of Co and Al in the shell layer have unconspicuous impact on material performances. It can be known from comparison between Examples 2, 10, 11, 13, and 15 that an appropriate content of Nb can greatly improve material performances.

Example 21

In Example 21, a preparation method of positive electrode material included the following steps (1) to (4):

(1) Nickel sulfate, cobalt sulfate, and manganese sulfate were used in a molar ratio of Ni:Co:Mn=90:5:5 to prepare a mixed salt solution A with a concentration of 4 mol/L, cobalt sulfate and aluminum sulfate were used in a molar ratio of Co:Al=85:15 to prepare a mixed salt solution B with a concentration of 4 mol/L, niobium chloride was used to prepare a salt solution C with a concentration of 1 mol/L, NaOH was used to prepare a precipitant solution D with a concentration of 8 mol/L, and ammonia water with a concentration of 8 mol/L was used as a complexing agent solution E;

(2) 10 L deionized water was added into an 18L reactor, a specified amount of ammonia water was added into the reactor to make the ammonia concentration be 0.4 mol/L, a specified amount of NaOH solution was added into the reactor to make the pH be 11.00, and the resulting product was marked as solvent F. In $N_2$ atmosphere, the solvent F was heated to 60° C. which was maintained, under a stirring velocity of 400 rpm, the mixed salt solution A, the precipitant solution D, and the complexing agent solution E were concurrently added into the solvent F for reactions for a period of time, and when the $D_{v50}$ of the precursor reached 8 μm, the adding the solution A was stopped;

(3) The solutions B and C were added into the reactor to continue the reaction, during the reaction, the amino value in the crystallization reactor was maintained at 0.4 mol/L, the pH was maintained at 11.00, and the reaction was stopped until a high-nickel ternary precursor whose $D_{v50}$ was 10 μm was synthesized, the resulting product was left for standing for 2 h. The resulting ternary precursor was cleaned, solid-liquid separated, and dried to obtain a core-shell structured high-nickel ternary precursor with a shell layer doped with element Nb; and (4) Lithium salt and the high-nickel ternary precursor were put into a coulter mixer in a molar ratio of, Li/Me, 1.01 for mixing, where Me was the total metal mole number of nickel, cobalt, and manganese, the mixed material was put into a kiln for sintering, where a sintering temperature was 800° C., a sintering time was 20 h, and a sintering atmosphere was $O_2$ atmosphere, and after sintering, a core-shell high-nickel ternary material whose shell layer was uniformly doped with element Nb was obtained.

The preparation methods of other structures in Example 21 are the same as those in Example 1. Details are not described herein again.

<Example 22> to <Example 29> and <Comparative Example 4> to <Comparative Example 11>

Examples 22 to 29 and Comparative Examples 4 to 11 used the same preparation method as in Example 1 to obtain the positive electrode material except that various preparation parameters were changed according to Table 3.

Test results for the positive electrode materials and secondary batteries obtained in Examples 21 to 29 and Comparative Examples 4 to 11 are shown in Table 4.

TABLE 3

| | Preparation method of positive electrode material includes the following steps (1) to (4) | | | | | | | |
|---|---|---|---|---|---|---|---|---|
| | Step (1): | | Step (2): | | Step (3): | | Step (4): | |
| No. | First mixed solution | Second mixed solution | pH value | Amino value (mol/L) | pH value | Amino value (mol/L) | Sintering temperature (° C.) | Sintering time (h) |
| Example 21 | Ni:Co:Mn = 90:5:5 | Co:Al:Nb = 94.4:5:0.6 | 11 | 0.4 | 11 | 0.4 | 800 | 20 |
| Example 22 | Ni:Co:Mn = 90:5:5 | Co:Al:Nb = 94.4:5:0.6 | 11.2 | 0.4 | 11.2 | 0.4 | 800 | 20 |

TABLE 3-continued

| No. | Step (1): First mixed solution | Step (1): Second mixed solution | Step (2): pH value | Step (2): Amino value (mol/L) | Step (3): pH value | Step (3): Amino value (mol/L) | Step (4): Sintering temperature (° C.) | Step (4): Sintering time (h) |
|---|---|---|---|---|---|---|---|---|
| | Preparation method of positive electrode material includes the following steps (1) to (4) | | | | | | | |
| Example 23 | Ni:Co:Mn = 90:5:5 | Co:Al:Nb = 94.4:5:0.6 | 12 | 0.4 | 12 | 0.4 | 800 | 20 |
| Example 24 | Ni:Co:Mn = 90:5:5 | Co:Al:Nb = 94.4:5:0.6 | 11.2 | 0.1 | 11.2 | 0.1 | 800 | 20 |
| Example 25 | Ni:Co:Mn = 90:5:5 | Co:Al:Nb = 94.4:5:0.6 | 11.2 | 0.6 | 11.2 | 0.6 | 800 | 20 |
| Example 26 | Ni:Co:Mn = 90:5:5 | Co:Al:Nb = 94.4:5:0.6 | 11.2 | 0.4 | 11.2 | 0.4 | 700 | 20 |
| Example 27 | Ni:Co:Mn = 90:5:5 | Co:Al:Nb = 94.4:5:0.6 | 11.2 | 0.4 | 11.2 | 0.4 | 900 | 20 |
| Example 28 | Ni:Co:Mn = 90:5:5 | Co:Al:Nb = 94.4:5:0.6 | 11.2 | 0.4 | 11.2 | 0.4 | 800 | 10 |
| Example 29 | Ni:Co:Mn = 90:5:5 | Co:Al:Nb = 94.4:5:0.6 | 11.2 | 0.4 | 11.2 | 0.4 | 800 | 15 |
| Comparative Example 4 | Ni:Co:Mn = 90:5:5 | Co:Al:Nb = 94.4:5:0.6 | 10.8 | 0.4 | 10.8 | 0.4 | 800 | 20 |
| Comparative Example 5 | Ni:Co:Mn = 90:5:5 | Co:Al:Nb = 94.4:5:0.6 | 12.3 | 0.4 | 12.3 | 0.4 | 800 | 20 |
| Comparative Example 6 | Ni:Co:Mn = 90:5:5 | Co:Al:Nb = 94.4:5:0.6 | 11.2 | 0.05 | 11.2 | 0.05 | 800 | 20 |
| Comparative Example 7 | Ni:Co:Mn = 90:5:5 | Co:Al:Nb = 94.4:5:0.6 | 11.2 | 0.8 | 11.2 | 0.8 | 800 | 20 |
| Comparative Example 8 | Ni:Co:Mn = 90:5:5 | Co:Al:Nb = 94.4:5:0.6 | 11.2 | 0.4 | 11.2 | 0.4 | 600 | 20 |
| Comparative Example 9 | Ni:Co:Mn = 90:5:5 | Co:Al:Nb = 94.4:5:0.6 | 11.2 | 0.4 | 11.2 | 0.4 | 950 | 20 |
| Comparative Example 10 | Ni:Co:Mn = 90:5:5 | Co:Al:Nb = 94.4:5:0.6 | 11.2 | 0.4 | 11.2 | 0.4 | 800 | 8 |
| Comparative Example 11 | Ni:Co:Mn = 90:5:5 | Co:Al:Nb = 94.4:5:0.6 | 11.2 | 0.4 | 11.2 | 0.4 | 800 | 30 |

TABLE 4

| No. | BET ($m^2$/g) | Concentration of lithium impurity (ppm) | Button cell capacity at 0.1 C. (mAh/g) | Initial coulombic efficiency (%) | Capacity at 1/3 C. (mAh/g) 100% SOC | Capacity after 300 cycles at 25° C. (%) | Capacity after 300 cycles at 45° C. (%) | 70° C. 30-day gassing volume (mL/Ah) |
|---|---|---|---|---|---|---|---|---|
| Example 21 | 0.495 | 1919 | 228 | 92.2 | 218 | 94.6 | 92.1 | 5.24 |
| Example 22 | 0.535 | 2006 | 229 | 92.5 | 220 | 95.8 | 92.5 | 5.38 |
| Example 23 | 0.621 | 2224 | 230 | 93 | 217 | 93.6 | 90.9 | 6.57 |
| Example 24 | 0.593 | 2185 | 230 | 92.9 | 219 | 92.9 | 90.2 | 7.44 |
| Example 25 | 0.507 | 2038 | 229 | 92.4 | 217 | 93.7 | 91 | 5.12 |
| Example 26 | 0.613 | 2254 | 226 | 91.3 | 214 | 94.7 | 91.5 | 7.26 |
| Example 27 | 0.499 | 1972 | 230 | 92.8 | 220 | 94.3 | 91.9 | 5.09 |
| Example 28 | 0.58 | 2192 | 227 | 91.6 | 219 | 93.2 | 90.6 | 7.01 |
| Example 29 | 0.452 | 1757 | 231 | 93.1 | 222 | 95.5 | 92.7 | 6.34 |
| Comparative Example 4 | 0.305 | 2681 | 218 | 88.2 | 210 | 89.4 | 81.5 | 15.4 |
| Comparative Example 5 | 0.471 | 2893 | 221 | 89.7 | 211 | 88 | 80.3 | 16.84 |
| Comparative Example 6 | 0.465 | 2935 | 221 | 89.4 | 210 | 87.6 | 80.8 | 19.73 |
| Comparative Example 7 | 0.718 | 3006 | 216 | 87.5 | 208 | 89.1 | 82.7 | 17.65 |
| Comparative Example 8 | 0.753 | 4357 | 212 | 85.9 | 199 | 76.5 | 54.6 | 23.58 |
| Comparative Example 9 | 0.625 | 1849 | 217 | 88.1 | 209 | 88.2 | 81.9 | 18.19 |
| Comparative Example 10 | 0.699 | 4294 | 217 | 87.8 | 207 | 88.6 | 79.3 | 16.26 |
| Comparative Example 11 | 0.583 | 2056 | 223 | 90.2 | 212 | 89.7 | 81.8 | 14.35 |

From Tables 3 and 4, in Comparative Examples 4 to 7, when the synthesis pH of the precursor is excessively low/the synthesis amino value is excessively high, the material grows rapidly, which is not conducive to stable crystallization; and when the pH is excessively high/the amino value is excessively low, the primary particles of the material are relatively thin, which is not conducive to long-term stability. In Comparative Examples 8 to 11, when the sintering temperature of the material is excessively low/the sintering time is excessively short, the crystal growth of the material is insufficient, and cycling performance of the material is relatively poor; and when the sintering temperature of the material is excessively high/the sintering time is excessively long, structures of the primary particles are destroyed, making the primary particles grow toward to be spherical particles and reducing the length-to-width ratio, and comprehensive performances of the primary particles cannot be well delivered. In Examples 21-29, under reasonable co-precipitation conditions and sintering process, the synthesized high-nickel material had high capacity, good cycling performance, and small gassing volume, indicating that the material has high structural stability.

It should be noted that this application is not limited to the foregoing examples. The foregoing embodiments are merely examples, and embodiments having constructions substantially the same as those of the technical idea and having the same effects as the technical idea within the scope of the technical solutions of this application are all included in the technical scope of this application. In addition, within the scope without departing from the essence of this application, various modifications that can be conceived by persons skilled in the art are applied to the embodiments, and other modes constructed by combining some of the constituent elements in the embodiments are also included in the scope of this application.

The invention claimed is:

1. A positive electrode material, comprising:
- a core; and
- a shell layer;
- wherein a molecular formula of the core is $Li_{1+a}Ni_xCo_yMn_{1-x-y}M1_zO_2$, $0.8 \leq x < 1.0$, $0 < y < 0.2$, $0 < a < 0.1$, $0 \leq z < 0.1$, and M1 is selected from at least one of Al, Ta, and B;
- and a molecular formula of the shell layer is $Li_{1+b}Co_mAl_nNb_{1-m-n}M2_cO_2$, $0.85 \leq m < 1.0$, $0 < n < 0.15$, $0 < b < 0.1$, $0.001 \leq 1-m-n \leq 0.02$, $0 \leq c < 0.05$, and M2 is selected from at least one of W, Mo, Y, or Yb,
- wherein an average length-to-width ratio of primary particles of the positive electrode material is 5-8,
- wherein a particle size distribution of the positive electrode material satisfies $1.35 \leq (D_v90-D_v10)/D_v50 \leq 1.50$.

2. The positive electrode material according to claim 1, wherein an average diameter of the core is 2 μm to 10 μm, and an average thickness of the shell layer is 0.5 μm-3 μm.

3. The positive electrode material according to claim 1, wherein
- a median particle size by volume $D_v50$ of the positive electrode material is 3 μm-16 μm.

4. The positive electrode material according to claim 3, wherein
- the median particle size by volume $D_v50$ of the positive electrode material is 5 μm-11 μm.

5. The positive electrode material according to claim 1, wherein
- a specific surface area of the positive electrode material is 0.2 $m^2/g$-$m^2/g$.

6. The positive electrode material according to claim 5, wherein
- the specific surface area of the positive electrode material is 0.3 $m^2/g$-0.7 $m^2/g$.

7. The positive electrode material according to claim 1, wherein
- a tap density (TD) of the positive electrode material is 1.8 $g/cm^3$-2.5 $g/cm^3$.

8. The positive electrode material according to claim 7, wherein
- the TD of the positive electrode material is 1.9 $g/cm^3$-2.3 $g/cm^3$.

9. The positive electrode material according to claim 1, wherein M1 is Ta.

10. A secondary battery, wherein
- the secondary battery comprises the positive electrode material according to claim 1.

11. A battery module, wherein
- the battery module comprises the secondary battery according to claim 10.

12. A battery pack, wherein
- the battery pack comprises the battery module according to claim 11.

13. An electric apparatus, wherein
- the electric apparatus comprises the secondary battery according to claim 10.

14. A preparation method of positive electrode material, the preparation method comprising:
- preparing a first mixed solution containing a soluble nickel salt, a first cobalt salt, and a manganese salt, preparing a second mixed solution containing a second cobalt salt and an aluminum salt, and preparing an alkali solution, an ammonia solution, and a niobium salt solution;
- adding pure water into a reactor as a solvent, adding the ammonia solution and the alkali solution in the reactor to adjust a pH value and an amino value of the solvent, stirring a resulting product, maintaining a stable reaction temperature, adding the first mixed solution, the alkali solution, and the ammonia solution concurrently into the reactor, maintaining the pH value and the amino value unchanged, and introducing an inert gas for protection, to synthesize a first precursor slurry;
- adding the second mixed solution, the niobium salt solution, the alkali solution, and the ammonia solution concurrently into the reactor, and maintaining the pH value and the amino value unchanged, to synthesize a second precursor slurry; and
- mixing the synthesized second precursor slurry and lithium salt based on a specified proportion for sintering to obtain a positive electrode material, wherein the positive electrode material comprises a core and a shell layer; wherein,
- a molecular formula of the core is $Li_{1+a}Ni_xCo_yMn_{1-x-y}M1_zO_2$, $0.8 \leq x < 1.0$, $0 < y < 0.2$, $0 < a < 0.1$, $0 \leq z < 0.1$, and M1 is selected from at least one of Al, Ta, and B;
- a molecular formula of the shell layer is $Li_{1+b}Co_mAl_nNb_{1-m-n}M2_cO_2$, $0.85 \leq m < 1.0$, $0 < n < 0.15$, $0 < b < 0.1$, $0.001 \leq 1-m-n \leq 0.02$, $0 \leq c < 0.05$, and M2 is selected from at least one of W, Mo, Y, or Yb,
- an average length-to-width ratio of primary particles of the positive electrode material is 5-8
- a particle size distribution of the positive electrode material satisfies $1.35 \leq (Dv90-Dv10)/Dv50 \leq 1.50$.

15. The preparation method of positive electrode material according to claim 14, wherein
- the soluble nickel salt contains one or more of nickel sulfate, nickel nitrate, and nickel acetate;
- the first cobalt salt and the second cobalt salt contain one or more of cobalt sulfate, cobalt oxalate, cobalt nitrate, and cobalt acetate;
- the manganese salt contains one or more of manganese sulfate, manganese nitrate, and manganese acetate;
- the aluminum salt contains one or more of aluminum sulfate, aluminum nitrate, aluminum chloride, aluminum acetate, and aluminum sulfite;
- the niobium salt contains one or more of niobium oxalate, sodium niobate, niobium nitrate, and niobium chloride;
- the alkali contains one or more of an alkali hydroxide, an alkaline earth hydroxide, and alkali metal carbonate.

16. The preparation method of positive electrode material according to claim 14, wherein
- a concentration of all metal ions in the first mixed solution is 1 mol/L-5 mol/L;

a concentration of all metal ions in the second mixed solution is 1 mol/L-5 mol/L;

a concentration of alkali in the alkali solution is 1 mol/L-10 mol/L;

a concentration of ammonia in the ammonia solution is 5 mol/L-10 mol/L;

a concentration of niobium salt in the niobium salt solution is 0.5 mol/L-2 mol/L.

17. The preparation method of positive electrode material according to claim 14, wherein the pH value is 11.0-12.0, and preferably 11.2-11.6;

the amino value is 0.1 mol/L-0.6 mol/L, and preferably 0.2 mol/L-0.5 mol/L;

the reaction temperature is 50° C.-70° C.;

a stirring velocity is 200 rpm-600 rpm.

18. The preparation method of positive electrode material according to claim 14, wherein a molar ratio of the lithium salt to metal in the second precursor slurry, denoted as Li/Me, is 0.9-1.1, Me is a total mole number of nickel, cobalt, and manganese;

a sintering temperature is 700° C.-900° C.;

a sintering time is 10 h-20 h; and/or a sintering atmosphere is air atmosphere or oxygen-containing atmosphere.

* * * * *